Oct. 11, 1927.
M. R. SCHALL
1,645,457
SET SCREWLESS COLLAR
Filed Sept. 22, 1926
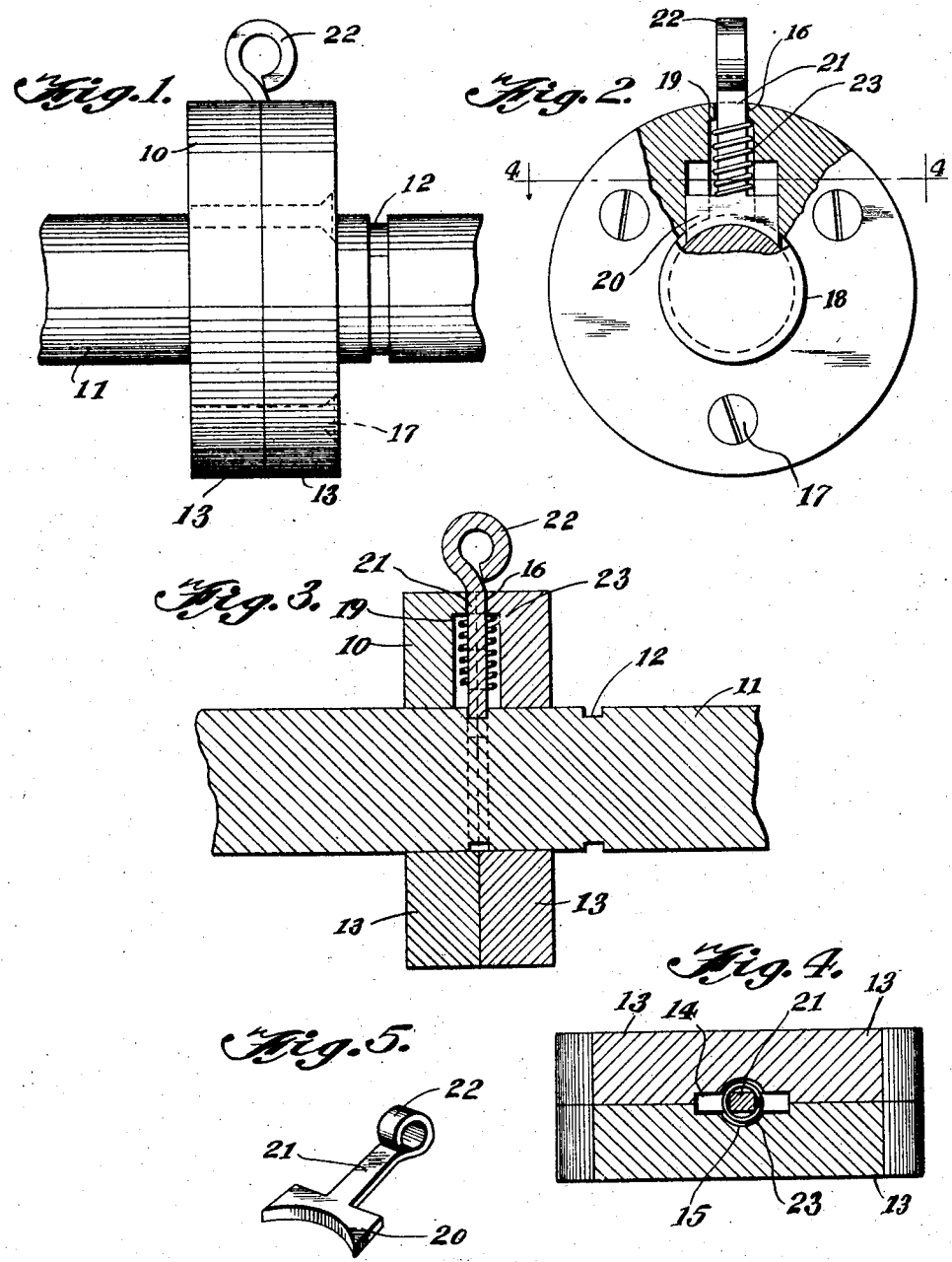
M.R. Schall
INVENTOR
BY Victor J. Evans
ATTORNEY
WITNESS Patented Oct. 11, 1927.

1,645,457

UNITED STATES PATENT OFFICE.

MYRON R. SCHALL, OF PALO ALTO, CALIFORNIA.

SET-SCREWLESS COLLAR.

Application filed September 22, 1926. Serial No. 137,132.

This invention relates to improvements in collars for shafts, axles and the like, an object being to provide a collar by means of which wheels, plates and so forth may be secured in place without the use of set screws, the construction and operation of the invention providing for the ready removal and replacement of the collar and the wheel or other member which it secures.

Another object of the invention is the provision of a collar of the above character which includes in addition to novel collar construction, novel means for its attachment to a shaft.

With the above and other objects in view, the invention further includes the following novel features and details of construction, to be hereinafter more fully described, illustrated in the accompanying drawings and pointed out in the appended claims.

In the drawings:—

Figure 1 is an elevation illustrating the improved collar in position on a shaft.

Figure 2 is an end view partly in section.

Figure 3 is a longitudinal sectional view.

Figure 4 is a section on the line 4—4 of Figure 2.

Figure 5 is a detail perspective view of the locking member.

Referring to the drawings in detail wherein like characters of reference denote corresponding parts, the reference character 10 indicates the collar which is mounted upon a shaft 11, the latter being provided with one or more circumferential grooves 12, the purpose of which will be hereinafter apparent.

The collar 10 is formed of a pair of complemental annular members 13, each of which is provided in one face with a flat substantially rectangular shallow recess 14, which is radially disposed, and a radially disposed substantially semi-circular recess 15 which communicates with and extends from the flat recess 14 and terminates in a reduced portion 16 at the outer periphery of the member 13.

The members 13 are secured together by means of screws or bolts 17, with their recessed faces in contact, so that the recesses 14 provide a radially disposed substantially rectangular chamber which opens into the bore 18 of the collar, and the recesses 15 provide a circular bore which communicates with said chamber and which terminates in a reduced peripheral portion, at the inner end of which is a shoulder 19.

A plunger 20 has a sliding fit within the rectangular chamber and has extending therefrom a shank 21 which projects beyond the periphery of the collar and is guided in the restricted portion 16 of the bore. The shank 21 may terminate in a finger piece 22.

Surrounding the shank 21 is a spring 23 whose inner end bears against the plunger 20 and whose outer end bears against the shoulder 19 so as to yieldingly force the plunger inward to engage the walls of one of the grooves 12. The collar may thus be readily attached to or removed from the shaft.

While the invention is especially designed for securing iron plates upon the shaft of a weight lifter's bar bell, it is obvious that it may be used in substitution of the old method of collar and set screw on any mechanical device, upon which it will provide greater efficiency and convenience.

The invention is susceptible of various changes in its form, proportions and minor details of construction and the right is herein reserved to make such changes as properly fall within the scope of the appended claims.

Having described the invention what is claimed is:—

1. In combination, a shaft having a circumferential groove therein, a collar for said shaft, said collar comprising a pair of annular complemental members, each of said members having a radially disposed substantially flat recess in one face and a transverse substantially semi-circular recess communicating with and extending from the flat recess to the outer periphery of said member, means to secure the members together with the recessed faces in contact to provide a radially disposed substantially rectangular chamber opening into the bore of the collar and a radially disposed bore communicating with said chamber, a plunger having a sliding fit within the chamber to engage the walls of the circumferential groove, a stem extending from the plunger through the radially disposed bore and a spring within said radially disposed bore around the stem to yieldingly hold the plunger in engaged position.

2. In combination, a cylindrical member having a circumferential groove therein, a collar adapted to be mounted on said member and comprising a pair of complemental members each having an opening therethrough and a recess in one face communicating with the opening, means to secure the complemental members together with the recessed faces opposed to provide a chamber, a spring actuated plunger operating within the chamber and a stem extending outward from said plunger beyond the edge of the collar.

In testimony whereof I affix my signature.

MYRON R. SCHALL.